United States Patent [19]
Fagerlind et al.

[11] Patent Number: 5,837,096
[45] Date of Patent: Nov. 17, 1998

[54] FALLING FILM EVAPORATOR

[75] Inventors: Olof Fagerlind, Foreboda, Sweden; Juhani Hoikkala, Varkaus, Finland; Krister Sannholm, Espoo, Finland; Ake Schonberg, Varkaus, Finland; Erik Agren, Esbo, Finland

[73] Assignee: Ahlstrom Machinery Oy, Noormarkku, Finland

[21] Appl. No.: 530,118

[22] PCT Filed: Feb. 13, 1995

[86] PCT No.: PCT/FI95/00059

§ 371 Date: Jan. 23, 1996

§ 102(e) Date: Jan. 23, 1996

[87] PCT Pub. No.: WO95/23015

PCT Pub. Date: Aug. 31, 1995

[30] Foreign Application Priority Data

Feb. 25, 1994 [FI] Finland ..................................... 940887

[51] Int. Cl.6 ................. F28B 9/04; F28D 3/04; F28F 3/12
[52] U.S. Cl. ......................... 159/13.3; 159/28.3; 165/115; 165/170
[58] Field of Search ................... 159/13.3, 28.3; 165/115, 170

[56] References Cited

U.S. PATENT DOCUMENTS

| | | | |
|---|---|---|---|
| 2,129,473 | 9/1938 | Mojonnier et al. | 165/115 |
| 3,331,436 | 7/1967 | Pauls | 165/170 |
| 3,332,469 | 7/1967 | Rosenbald | 165/115 |
| 3,351,119 | 11/1967 | Rosenbald | 165/115 |
| 3,736,783 | 6/1973 | Fabri | 72/57 |
| 4,076,576 | 2/1978 | Marttala | 159/13 B |
| 4,235,281 | 11/1980 | Fitch et al. | 165/115 |
| 4,422,899 | 12/1983 | Juhola et al. | 159/13 |
| 4,683,025 | 7/1987 | Flores | 165/115 |
| 4,687,053 | 8/1987 | Paulus et al. | 165/133 |
| 4,859,265 | 8/1989 | Shuster et al. | 165/170 |

FOREIGN PATENT DOCUMENTS

| | | |
|---|---|---|
| 162271 | 7/1988 | European Pat. Off. . |
| 567393 | 10/1993 | European Pat. Off. . |
| 2539856 | 3/1977 | Germany . |
| 1167090 | 10/1969 | United Kingdom . |
| 1388125 | 3/1975 | United Kingdom . |

*Primary Examiner*—Cynthia L. Nessler
*Attorney, Agent, or Firm*—Nixon & Vanderhye P.C.

[57] ABSTRACT

A falling film evaporator includes a shell with a number of heat transfer elements within the shell. Each heat transfer element has two opposed essentially rectangular plates joined together along upright sides and along seams substantially parallel to the upright sides. The seams form with each other, and the upright sides, a number of vertical flow channels through which steam (heating fluid) flows in the interior of the heat transfer elements to evaporate evaporable liquid flowing downwardly in a film over the outer surfaces of the heat transfer plates.

14 Claims, 2 Drawing Sheets

FALLING FILM EVAPORATOR

BACKGROUND AND SUMMARY OF THE INVENTION

The present invention relates to a falling film evaporator comprising a shell with a plurality of evaporator elements arranged therein, each element being formed by to vertical, essentially rectangular heat transfer plates;

means for feeding liquid to be evaporated so as to flow downwards as a thin film along the outer surfaces of the evaporator elements; and means for directing steam to the inside of the evaporator elements and for discharging formed condensate from the inside.

A well-known falling film evaporator apparatus comprises evaporator elements made of two metal plates so that the plates are attached to each other not only by their edges but also by certain dot-like places. In a complete heat transfer element the flow channel for the heat transfer medium is thereby formed in areas between these dot-like places, i.e. in areas where the plates are separated from each other. This king of elements have been formed by placing a pair of plates between studded support plates, the studs of which define the position of the dot-like fastening spots, dimples, of the heat transfer elements. The plates are then separated from each other by means of internal hydrostatic pressure.

U.S. Pat. No. 3,736,783 discloses an apparatus for manufacturing heat transfer elements, the apparatus comprising a fixed bottom part and an upper part, movable along tracks onto the lower part once a pair of heat transfer plates has been located in the lower part. The fixed bottom part comprises an upwards opening box-like space containing an inflatable bag. A piston plate supported by this bag can be moved vertically. The piston plate in turn supports a studded plate, the studs of which are directed upwards. When the pair of plates has been positioned between the studded plates, it is pressed against the upper part of the apparatus by filling the bag with, e.g. water, causing the piston plate to move upwards. In order to form flow channels, the plates are separated from each other by means of hydraulic pressure, i.e. by directing pressurized water between plates, whereby the plates are separated from each other in other places except at the edges and the dot-like places where the studs prevent expansion and maintain the plates in contact. The plates can be spot-welded to increase strength at the dimples, between which flow channels were formed.

The heat transfer elements described above are often used in evaporators, in which—in case it is falling film apparatus—the liquid to be evaporated is directed to flow along the outer side of the element and steam is directed to flow inside the element in the channels between the dimples. Evaporators often operate in high steam pressures, e.g. about 4 bar, which places a great stress on the dot-like fastening points, and can even break the fastening. Even though the elements are always pressure tested at pressures exceeding the projected operating pressures, it is still reasonable to develop more pressure resistant heat transfer elements. This is especially necessary because of the tendency towards higher operating pressures, because of the advantages brought about by increased steam pressure.

The object of the present invention is to provide a falling film evaporator, with an essentially more pressure resistant evaporator element structure than that of the present designs.

A characterizing feature of an evaporator according to the invention is that the heat transfer plates of each of the evaporator element are jointed together along the upright edges and seam joints, parallel with the upright edges and located within a distance from each other, thus forming tube-like flow channels for steam inside the element.

According to an advantageous embodiment of the invention the seam joints do not extend quite from one to the other end of the plate, but feed and discharge chambers, perpendicular to the seams and thus also to the flow channels, are formed for feeding and discharging steam at the ends of the element. These chambers communicate with the flow channels.

According to another advantageous embodiment of the invention, the seam extends the whole length of the plates. In this case, the chambers for directing steam are formed by joining, preferably by welding, a separate tubular chamber at both the upper and lower edges of the pair of plates.

The feed chambers of each heat transfer element communicate with a header for directing steam from the steam ducts to the elements. Correspondingly, discharge chambers communicate at the lower end of the elements with steam and condensate discharge conduits.

For operating the evaporator, steam is led to a feed chamber located at the upper end of the element, the chamber communicating with each of the upright flow channels formed between the seams. Steam is divided into the flow channels and the formed condensate is discharged from the lower end of the element via a discharge chamber communicating with all the flow channels. Advantageously, steam is fed into the feed chamber via both of its ends, i.e. from two directions, which enables the size of the chamber to be kept small.

When the evaporator elements are installed within the shell of the evaporator, the feed chambers of adjacent elements can form a distribution box for the liquid to be evaporated, because the feed chambers are located so near to each other. Thus, a conventional distribution box is unnecessary. The feed chamber can also act as a mechanical support member of the element within the evaporator, whereby the ends of the chambers are installed at support lugs arranged in the shell of the evaporator.

The seams limiting the tube-like channels are narrow, about 5–15mm in width. The seams are located within 15–30 mm from each other.

The joining seams between the flow channels of the evaporator elements can be formed either by continuous or spot welding, Should spot welding be used, the weld spots almost contact adjacent ones. In some cases it can be advantageous to break a continuous seam for forming an opening between the flow channels for pressure regulating reasons.

If desired, steam can also be fed from the bottom of the element in which case condensate is discharged the same way as when feeding steam from the top, but steam is discharged from the top of the element.

In the following, the invention is disclosed in more detail by way of reference to the accompanying figures, of which

DETAILED DESCRIPTION OF THE DRAWINGS

Figure 1:
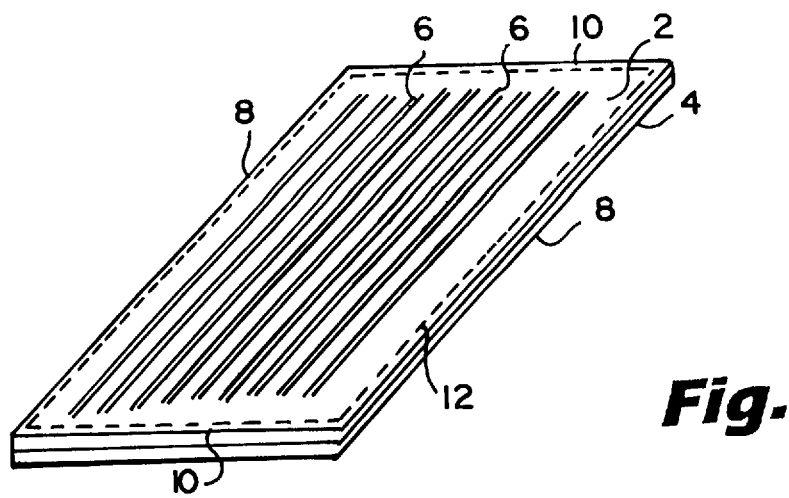
FIG. 1 is an illustration of a pair of plates joined together for forming an evaporator element according to the invention.

FIG. 1 discloses a pair of plates to be used in an evaporator according to the invention. The superimposed plates Z and 4 are rectangular and symmetrical. Evaporator elements are formed by two metal plates, the thickness of which is usually 1–1.5 mm. The plates are usually welded together continuously parallel with the longer seams of the plates for forming seams 6. The seams do not extend the whole length of the edge 8, but the plates are left unjoined at both ends, so as to enable forming of perpendicular channels between the plates, These channels, one of which is located at the lower end of the element and the other at the upper end, are parallel with the ends 10 of the plate. After this, the plates are joined together by continuous welding along all edges, i.e. sides 8 and ends 10. Thus, a tight and pressure resistant seam 12 is formed around the element along its edges.

Because the evaporating element is installed during operation so that the channels between seams 6 are upright, the edges 8 form the sides and edges 10 form the upper and lower ends of the element.

The welded pair of plates is then installed in an inflation apparatus (not shown) for opening it and thus defining the final form of the evaporator element. The apparatus comprises an upper element and a lower element. A piston assembly is connected with the lower element.

Prior to being inserted in the inflation apparatus, the pair of element plates is placed between support plates of the same shape and at least the same size as the heat transfer plates. The support plates comprise longitudinal protrusions, the length and width of which correspond to the dimensions of the seams 6 of the pair of plates. The pair of plates is loaded between support plates so that the protrusions face the heat transfer plates and are located on the seams 6. The pair of plates is transported to the space between the upper and lower element on an inflation table by means of, e.g. a transport jig. The piston assembly is hydraulically pressurized as much as necessary, whereby the piston plate presses the pair of plates against the upper element.

Subsequent to this, the pair of heat transfer plates is actually inflated. Pressurized water is led between the pair of plates via an opening (not shown) in the seam 12. The pressure of the water is sufficient to slightly exceed the yield limit of the plate material. Water is allowed to flow via the space between the end 10 of the plate and seams 6 into channels between seams 6. The pressure is regulated so as to be sufficient to separate the plates in all places except seams 6, which are additionally supported by the protrusions of the support plates. The continuous welds along sides 10 are not supported during opening, but they will easily withstand a rigorous pressure test.

When the heat transfer plates have been inflated to desired degree, pressure is released from the element and the piston assembly.

Figure 2:
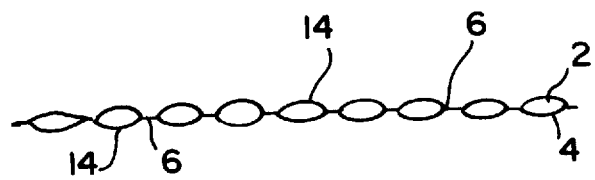
FIG. 2 shows the cross-section along line A—A in FIG. 3.
Figure 3:
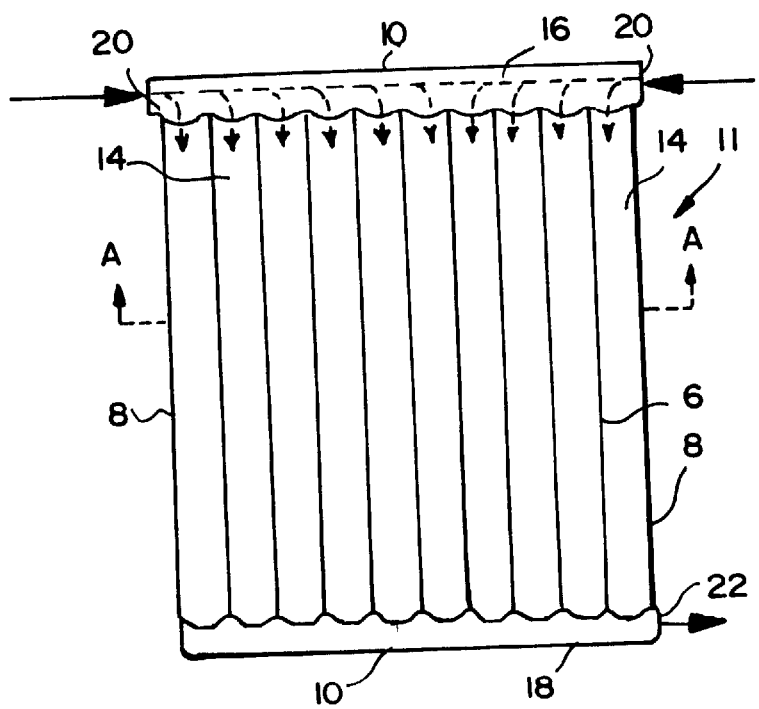
FIG. 3 is a profile view of an evaporator element formed by a pair of plates illustrated in FIG. 1.

The inflation of the pair of plates produces an element 11, illustrated in FIGS. 2 and 3. In the element, the plates 2 and 4 are separated from each other in every other place except at the welded sides 8 and 10 and seams 6. A plurality of adjacent tube-like channels 14 have been formed between the seams 6, and it is these channels that enable the flow of heating medium, such as steam, to flow from inlet to outlet. Chambers 16 and 18 are arranged essentially perpendicularly to the channels 14 for inlet and outlet of steam into and from the channels 14. The seams between the channels can be welded so that they extend the whole length of the plate, in which case the chambers 16, 18 are formed by welding tubes, preferably round in profile, to both the upper and lower ends of the pair of plates. The length of the tube is such that the element can be supported by it, hanging on support lugs arranged on the shell of the evaporator.

FIG. 2 illustrates a cross-section, in which the profile of a flow channel is wave-like (two waves positioned opposite each other). The cross-section profile of an open tube-like channel is not limited to this, but the profile can be e.g. round or elliptical. The profile of the channel depends on, among other factors, the plate material and other circumstances during forming, such as pressure.

The complete element is pressure tested and inlet and outlet openings 20, 22 are cut for the medium flowing inside the element.

Figure 4:
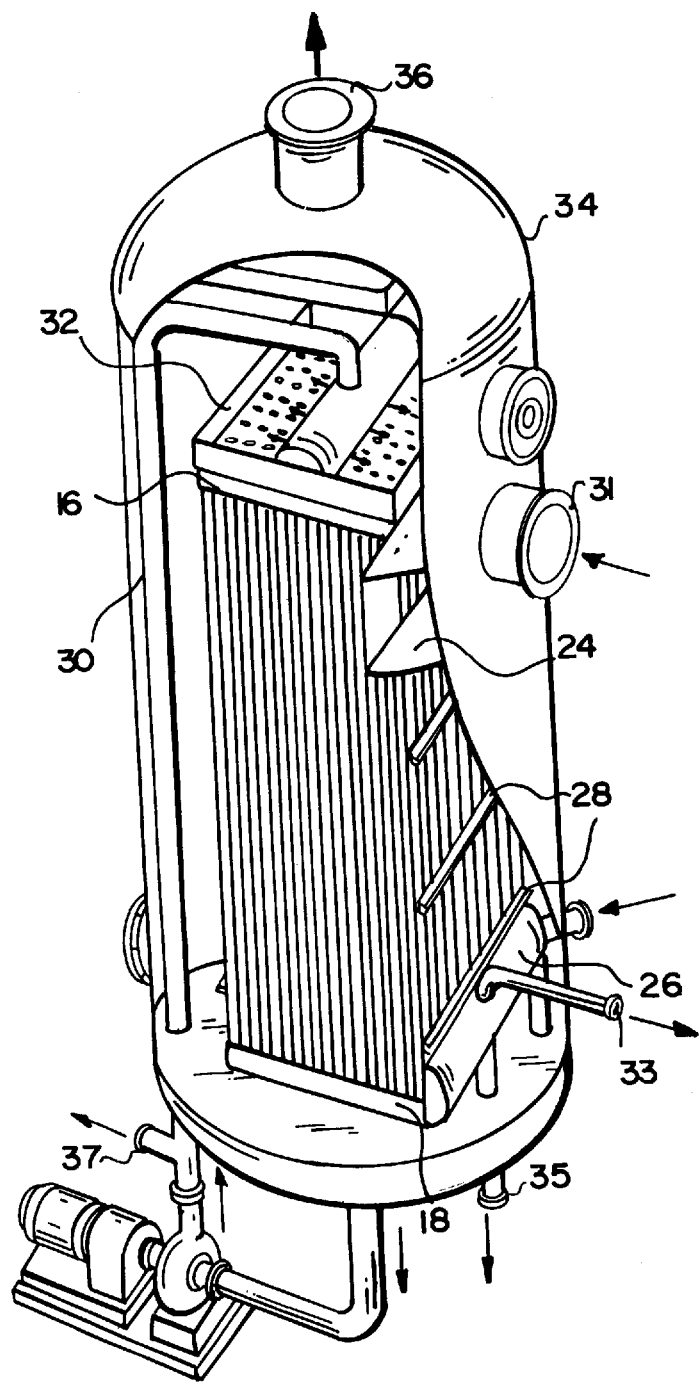
FIG. 4 shows an evaporator according to the invention.

FIG. 4 shows an evaporator according to the invention, the heat transfer surface of which comprises the above-described elements. Single elements are collected together for one evaporator (e.g. 30 elements) beside each other into assembly jigs, in which they are transported and handled during the manufacture phases of an evaporator unit. In the first phase the steam header 24, condensate header 26 and notched space bars 28 are welded on place in the plate module. Subsequent to this, steam inlet conduit and condensate outlet conduit are welded on the module. A plurality of modules are installed inside a pressure vessel, the shell 34 of the evaporator, to form an "evaporator package".

The steam is fed into the evaporator inlet header 24 via conduit 31. Inside each element, steam flows into the inlet chambers 16, and from there further to flow channels 14. Outlet steam and condensate are discharged from the evaporator via outlet chamber 18 into outlet header 26, from which steam is discharged via conduit 33 and condensate via conduit 35. Evaporated liquid is discharged via conduit 37.

The liquid to be evaporated is fed to the upper part of the elements, from which it flows downwards on the outside of the element, boiling FIG. 4 shows a conventional distribution box 32 arranged above the elements, the bottom of which is provided with perforation for allowing the liquid to flow onto the surface of the elements. The distribution box is not, however, essential, because the liquid can also be distributed directly into the upper part of the plates, if the inlet chambers 16 of the plates are so close to each other that they form an effective liquid distributor.

As has been shown in the above, the invention is capable of producing a flow channel structure far exceeding prior art structure in durability. The invention is not limited to the embodiment described above, but its details can be varied within the scope of the invention defined in the appended claims.

We claim:

1. A method of making a falling film evaporator, and evaporating a liquid using a falling film evaporator comprising a shell with a plurality of evaporator elements vertically disposed therein, each evaporator element comprising two substantially rectangular metal heat transfer plates having first and second vertical side edges and a plurality of seams connecting the plates together at spaced locations substantially parallel to the side edges and forming tube-like flow channels within the elements, the plates having outer major surfaces and defining an interior; said method comprising the steps of:

(a) welding together the two substantially rectangular metal heat transfer plates for forming each evaporator element, to form a plurality of seams substantially parallel to each other and to the plate side edges and defining channels between the seams;

(b) placing the metal heat transfer plates between support plates of the same shape and at least the same size as the heat transfer plates, the support plates comprising longitudinal protrusions the length and width of which correspond to the dimensions of the seams of the metal heat transfer plates, and the support plates being positioned so that the longitudinal protrusions engage the seams;

(c) inflating the channels between the seams to make tube-like flow channels by forcing between the seams liquid under a pressure sufficient to slightly exceed the yield limit of the metal heat transfer plates;

(d) installing the evaporator elements in the shell so that the tube-like flow channels are substantially vertical;

(e) feeding liquid to be evaporated into the shell so that it flows down the outer surfaces of the metal evaporator elements as a thin film;

(f) feeding steam into the interiors of the evaporator elements so that the steam flows through the tube-like flow channels of the evaporator elements from a top portion to a bottom portion thereof; and (g) discharging steam and any formed condensate from adjacent the bottom portions of the evaporator elements.

2. A method as recited in claim 1 wherein step (g) is practiced by discharging the steam and the formed condensate in different flow paths.

3. A method as recited in claim 1 wherein each of the elements has first and second ends at the top thereof; and wherein step (f) is practiced by feeding the steam into both the first and second ends of the elements.

4. A method as recited in claim 1 wherein step (a) is practiced by forming the seams with a width of about 5–15 mm, and so that the channels between the seams are spaced about 15–30 mm apart.

5. A falling film evaporator comprising:

an evaporator shell;

a plurality of evaporator elements, each comprising two upright, essentially rectangular metal heat transfer plates, having two major outer surfaces and first and second opposite substantially parallel side edges, and an interior between said plates;

said metal heat transfer plates joined together along said first and second opposite substantially parallel side edges thereof and along seams substantially parallel to said first and second side edges, said seams forming with each other, and said first and second side edges, a plurality of tube-like flow channels in said interior of said element;

said elements mounted within said shell so that said first and second sides, and seams of said plates, are substantially vertical;

means for feeding liquid to be evaporated to flow as a thin film down said outer surfaces of said evaporator elements;

means for feeding heating fluid, and discharging heating fluid and formed condensate, from said interiors of said elements; and wherein said seams are shorter than said first and second side edges of said plates so as to define tubular inlet and outlet chambers substantially perpendicular to said channels, above and below said channels, said tubular inlet and outlet chambers for directing and discharging heating fluid to and from said flow channels, and in communication with said means for feeding heating fluid, and discharging heating fluid and formed condensate.

6. A falling film evaporator as recited in claim 5 further comprising a first header connected to said inlet chamber and a second header connected to said outlet chamber of each of said elements; and further comprising a heating fluid inlet conduit penetrating said shell and connected to said first header, and a heating fluid outlet conduit penetrating said shell and connected to said second header.

7. A failing film evaporator as recited in claim 5 wherein each element inlet chamber has first and second ends; and wherein said means for feeding heating fluid to said elements feeds heating fluid to both said first and second ends of said inlet chambers.

8. A falling film evaporator as recited in claim 5 further comprising a plurality of notched space bars connected to said elements and spacing said elements from each other within said shell.

9. A falling film evaporator as recited in claim 5 wherein said seams are about 5–15 mm in width, and spaced about 15–30 mm from each other.

10. A falling film evaporator comprising:

an evaporator shell;

a plurality of evaporator elements, each comprising two upright, essentially rectangular metal heat transfer plates, having two major outer surfaces and first and second opposite substantially parallel side edges, and an interior between said plates;

said metal heat transfer plates joined together along said first and second opposite substantially parallel side edges thereof and along seams substantially parallel to said first and second side edges, said seams forming with each other, and said first and second side edges, a plurality of tube-like flow channels in said interior of said element;

said elements mounted within said shell so that said first and second sides, and seams of said plates, are substantially vertical;

means for feeding liquid to be evaporated to flow as a thin film down said outer surfaces of said evaporator elements;

means for feeding heating fluid, and discharging heating fluid and formed condensate, from said interiors of said elements;

wherein said seams are substantially as long as said first and second edges of said plates, and wherein said plates have a top and a bottom; and distinct tubular inlet and outlet chambers attached to the top and bottom of each of said elements and in communication with said means for feeding heating fluid, and discharging heating fluid and formed condensate, from said elements.

11. A falling film evaporator as recited in claim 10 further comprising a first header connected to said inlet chamber and a second header connected to said outlet chamber of each of said elements; and further comprising a heating fluid inlet conduit penetrating said shell and connected to said first header, and a heating fluid outlet conduit penetrating said shell and connected to said second header.

12. A falling film evaporator as recited in claim 10 wherein each element inlet chamber has first and second ends; and wherein said means for feeding heating fluid to said elements feeds heating fluid to both said first and second ends of said inlet chambers.

13. A falling film evaporator as recited in claim 10 further comprising a plurality of notched space bars connected to said elements and spacing said elements from each other within said shell.

14. A falling film evaporator as recited in claim 10 wherein said seams are about 5–15 mm in width, and spaced about 15–30 mm from each other.

* * * * *